(12) United States Patent
Nagashima

(10) Patent No.: US 6,773,375 B2
(45) Date of Patent: Aug. 10, 2004

(54) PORTABLE TRIMMER

(75) Inventor: Akira Nagashima, Kawasaki (JP)

(73) Assignee: Kioritz Corporation, Tokyo (JP)

( * ) Notice: Subject to any disclaimer, the term of this patent is extended or adjusted under 35 U.S.C. 154(b) by 81 days.

(21) Appl. No.: 10/307,310

(22) Filed: Dec. 2, 2002

(65) Prior Publication Data

US 2003/0101593 A1 Jun. 5, 2003

(30) Foreign Application Priority Data

Dec. 3, 2001 (JP) ........................................ 2001-368569

(51) Int. Cl.[7] ............................................. B60K 41/20
(52) U.S. Cl. ....................... 477/200; 477/207; 30/277.4
(58) Field of Search .......................... 30/277.4; 56/11.3; 83/400; 173/221; 477/200, 209

(56) References Cited

U.S. PATENT DOCUMENTS 6,056,668 A * 5/2000 Nagashima ................. 477/207
6,167,973 B1    1/2001 Nagashima
6,640,444 B1 * 11/2003 Harada et al. ............. 30/277.4

OTHER PUBLICATIONS

Pending U.S. patent application Ser. No. 09/461,430 filed Dec. 16, 1999, Kazuo Harada and Toshiyuki Takano.

* cited by examiner

Primary Examiner—Dirk Wright
(74) Attorney, Agent, or Firm—Nixon Peabody, LLP; Donald Studebaker

(57) ABSTRACT

A portable trimmer capable of applying to a throttle valve a different operation from that according to a throttle operation lever. The portable trimmer includes a brake device for braking the movement of a cutting blade that is released in conjunction with a throttle operation. The portable trimmer includes a throttle wire having a first throttle wire extending between a throttle operation lever and a swingable member, and a second wire portion extending between a swingable member and a throttle to provide a first operation transmission path for transmitting the movement of the throttle operation lever to the throttle valve. The portable trimmer further includes an additional operation lever for performing a different operation from said throttle operation, and a pulley pivotally attached to the swingable member. The second wire portion extends between the throttle and the additional operation lever through the pulley to provide a second operation transmission path independent of the first operation transmission path.

6 Claims, 3 Drawing Sheets

PORTABLE TRIMMER

BACKGROUND OF THE INVENTION

The present invention relates to a portable trimmer for cutting grasses, bushes or the like, and more particularly to a portable trimmer in which a brake device for braking the movement of a cutting blade is released in conjunction with a throttle operation of a carburetor.

DESCRIPTION OF THE RELATED ART

In portable trimmers for cutting grasses, bushes or the like which are adapted to be driven by an internal combustion engine, such as a compact air-cooled two-stroke cycle gasoline engine, there has been known one type of portable trimmer in which a brake device for braking the movement of a cutting blade is released in conjunction with a throttle operation of a carburetor. For example, such a type of portable trimmer is disclosed in Japanese Patent Laid-Open Publication No. 11-196648. This portable trimmer includes a friction member, and a swingable member for moving the friction member between a brake position, where the friction member is pressed against a clutch drum, and a release position, where the friction member is spaced apart therefrom. Further, the swingable member is adapted to swing in response to the movement of a throttle wire operated by a throttle operation lever for controlling an opening of a throttle valve of a carburetor.

It is an object of the present invention to provide an improved portable trimmer of the type in which a brake device for braking the movement of a cutting blade is released in conjunction with a throttle operation operated by a throttle operation lever and is capable of performing a different operation from the throttle operation by the throttle operation lever.

SUMMARY OF THE INVENTION

In order to achieve the above-mentioned object, the present invention provides a portable trimmer which comprises an internal combustion engine, a cutting blade driven by the internal combustion engine, and a centrifugal clutch having a clutch drum for transmitting a driving force of the internal combustion engine to the cutting blade. The portable trimmer further comprises a carburetor having a throttle, a throttle operation lever for opening the throttle, a throttle wire extending between the throttle operation lever and the carburetor, and a swingable member interposed in the throttle wire and being swingable in response to a pulling force of the throttle wire exerted by an operation of the throttle operation lever. The throttle wire includes a first wire portion extending between the throttle operation lever and the swingable member and a second wire portion extending between the swingable member and the carburetor to provide a first operation transmission path for transmitting the movement of the throttle operation lever to the carburetor. Furthermore, the portable trimmer has a brake device for braking the movement of the cutting blade and is released in conjunction with the operation of the throttle operation lever. The brake device includes a friction member which is movable in response to the swing movement of the swingable member between a brake position where the friction member is pressed against the clutch drum, and a release position where the friction member is spaced apart therefrom.

Further, an additional operation lever is provided for performing a different operation from the throttle operation to the portable trimmer. The swingable member is provided with a pulley pivotally attached thereto. The second wire portion extends between the carburetor and the additional operation lever via the pulley to provide a second operation transmission path independent from the first operation transmission path.

The portable trimmer of the present invention includes the first operation transmission path for transmitting the movement of the throttle operation lever to the carburetor to control an opening of a throttle valve of the carburetor, and the second operation transmission path independent of the first operation transmission path, in which the movement of an additional operation lever acts only on the second wire portion. More specifically, in the first operation transmission path, the movement of the throttle operation lever is transmitted to the throttle valve through the first wire portion, the swingable member and the second wire portion to control the opening of the throttle valve and the braking function of the brake device. On the other hand, in the second operation transmission path, the movement of the additional operation lever acts only on the second wire portion extending to the throttle valve via the pulley.

According to the present invention, the portable trimmer has the first operation transmission path for transmitting the movement of the throttle operation lever to control the opening of the throttle valve and the braking function of the brake device, and the second operation transmission path that is independent of the first operation transmission path. Thus, various operational functions of the throttle valve can be added to the portable trimmer.

In an embodiment of the present invention, the second wire portion has a predetermined amount of play for taking up a pulling force which is otherwise applied to the second wire portion in an initial stroke range of the throttle operation lever—the play is set such that the engine is operable at a given intermediate power when the throttle operation lever is at a full stroke position, and the additional operation lever is a power adjusting lever operable to pull the second wire portion to open the carburetor so as to increase a power of the engine higher than the given intermediate power when the throttle operation lever is the full stroke position. This embodiment can facilitate to simplify a structure for adjusting engine power.

In another embodiment of the present invention, the additional operation lever may be an idle-up lever operable to pull the second wire portion so as to partially open the carburetor to increase an idling speed of the engine at the time of starting the engine. This embodiment can facilitate simplifying a structure for providing increased idling speed during warm up of the engine.

In still another embodiment of the present invention, the portable trimmer may further include an intermediate member coupled to the second operation transmission path, and a housing for enclosing at least a part of the engine. In this embodiment, the carburetor is located at a lateral and upward position with respect to the clutch drum when viewed in a direction parallel to a rotational axis of the clutch drum. The swingable member is located above the clutch drum and the intermediate member is disposed between the swingable member and the carburetor. The first wire portion extends vertically to the swingable member in a side interior space of the housing on the opposite side of the carburetor with respect to the clutch drum. Further, the second wire portion has a first end coupled to the carburetor and a second end coupled to the intermediate member. The second wire portion extends laterally from the carburetor in an upper interior space of the housing above the clutch drum and then curves along the pulley and extends to the second end. Thus, a pulling force generated by operating the additional operation lever is transmitted to the second wire portion through the intermediate member. According to this embodiment, various components can be efficiently incorporated in the existing interior space of the engine housing around the clutch drum, which prevents the portable trimmer from increasing in size.

DETAILED DESCRIPTION OF THE PREFERRED EMBODIMENT

With reference to the accompanying drawings, various portable trimmers according to embodiments of the present invention will now be described.

Figure 2:
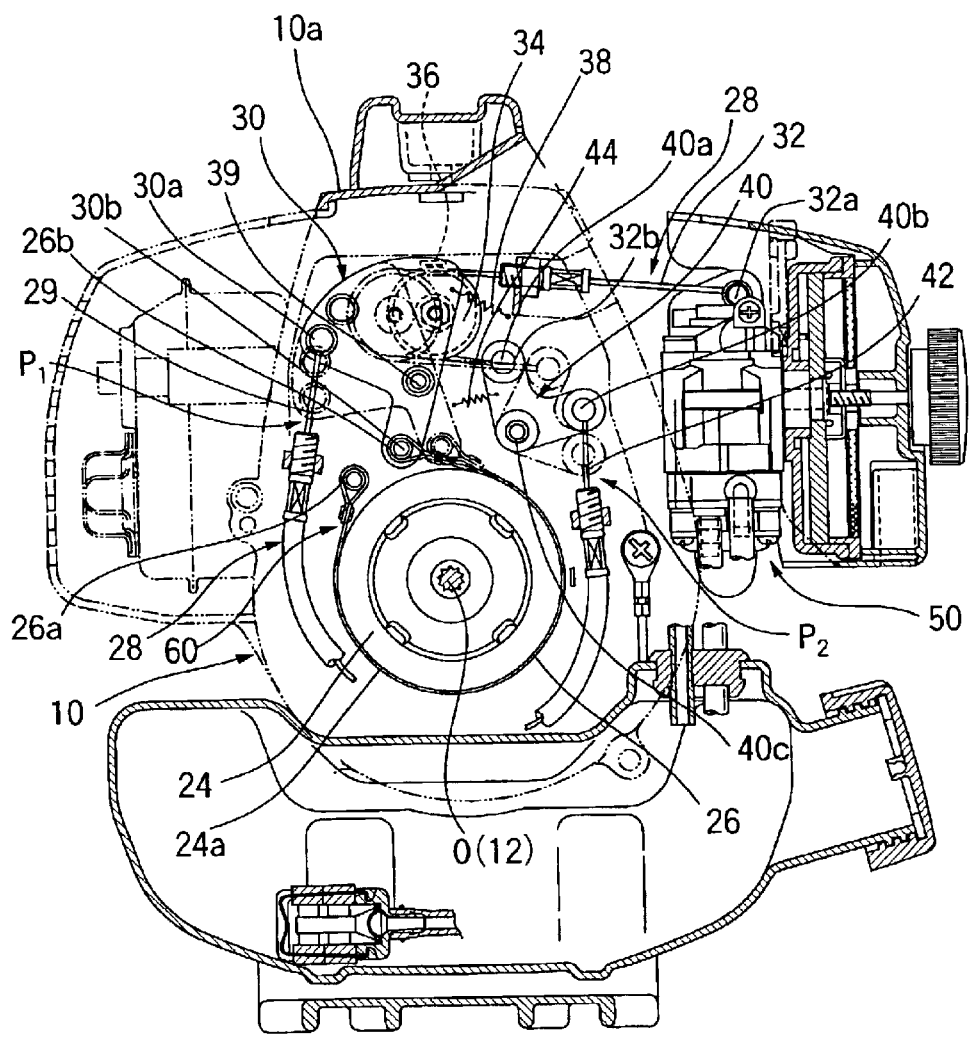
FIG. 2 is a view showing the internal structure of the body of the portable trimmer according to the first embodiment of the present invention.

A portable trimmer 2 according to the first embodiment is adapted to release a brake device 60, as shown in FIG. 2, for braking the movement of a cutting blade 8 in conjunction with a throttle operation. Further, a so-called partial operating function is employed in the portable trimmer 2 according to the first embodiment. That is, the portable trimmer 2 includes a mechanism for allowing an internal combustion engine to be selectively operated at either one of a given intermediate power and a higher power than the given intermediate power. Because, in an actual cutting operation using the portable trimmer 2, relatively soft grasses such as lawns in a garden can be adequately cut even if the portable trimmer 2 is equipped with a small-size air-cooled two-stroke cycle gasoline engine which is operated at a relatively low power. This operation is advantageous to assure safety in the work, while relatively hard weeds or bushes in mountainous areas should be cut by operating the engine at its maximum power. This mechanism will be described in detail here-below.

Figure 1:
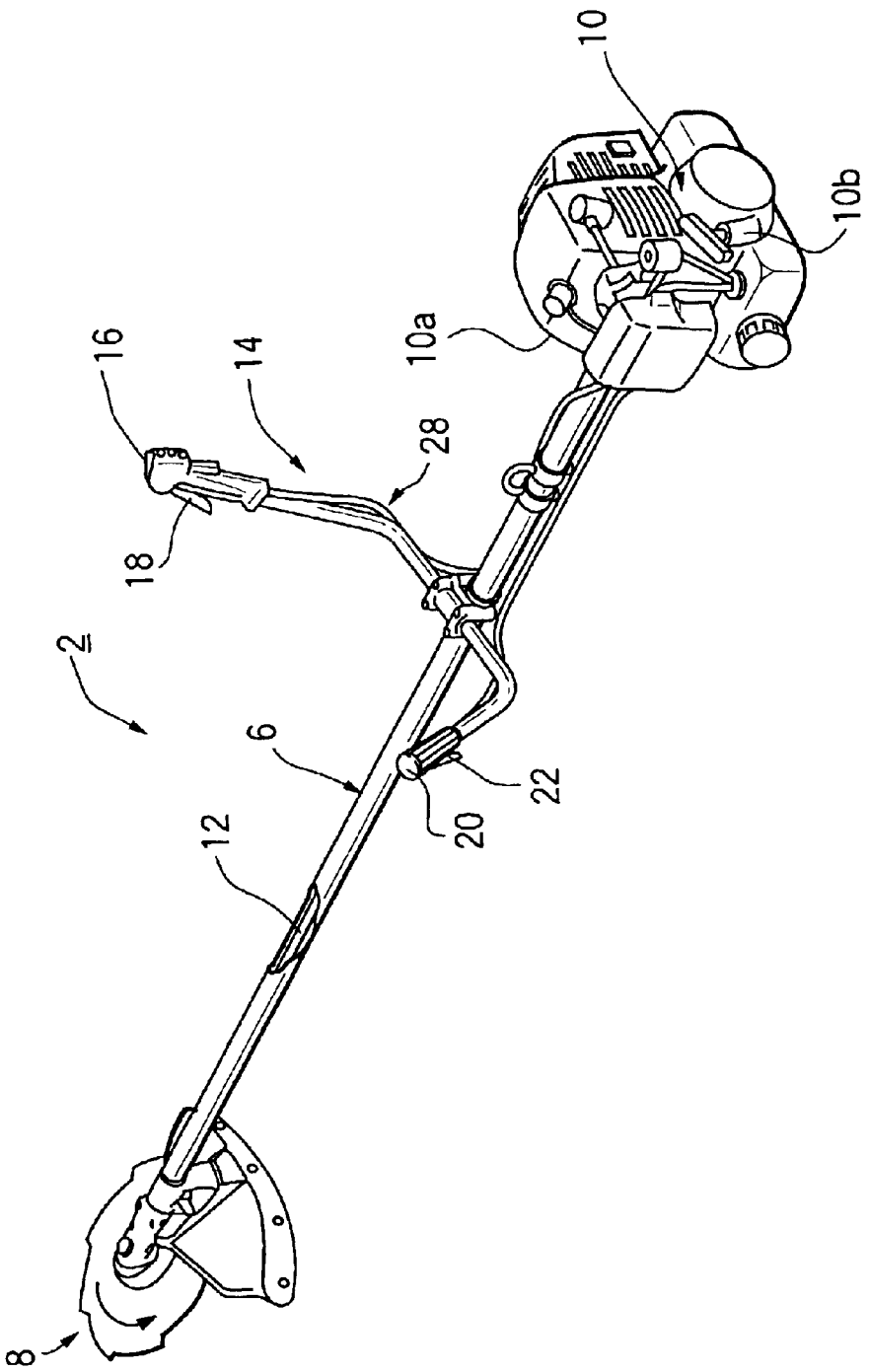
FIG. 1 is a general view of a portable trimmer according to a first embodiment of the present invention.

As shown in FIG. 1, the portable trimmer 2 essentially comprises an internal combustion engine 10, such as a small-size air-cooled two-stroke cycle gasoline engine, disposed at the rear end of the trimmer 2, an operation rod 6 extending straight forwardly from the engine 10, and a cutting blade 8 attached to the forward end of the operation rod 6. The operation rod 6 has an inner space for receiving therein a transmission shaft 12 for transmitting a rotational power from the engine 10 to the cutting blade 8. The transmission shaft 12 extends straight through the inner space thereof. An U-shaped handle 14 is provided at about intermediate position along the operation rod 6. The handle 14 includes a right grip 16 provided with a throttle operation lever 18, and a left grip 20 provided with a power adjustment lever 22 serving as an additional operation lever for allowing the engine 10 to be operated at a higher power than a given intermediate power at a full stroke position of the throttle operation lever 18. That is, when the throttle operation lever 18 is moved to the full stroke position, the power of the engine is increased up to the given intermediate power. If the power adjustment lever 22 is moved to its full-stroke position while maintaining the full stroke position of the throttle operation lever 18, the engine can be operated at a higher power than the given intermediate power.

A centrifugal clutch is interposed between the engine 10 and the transmission shaft 12. The centrifugal clutch includes a dish-shaped circular clutch drum 24 (see FIG. 2) having a peripheral wall 24a, and a shoe member (not shown) adapted to be pressed against an inner peripheral surface of the peripheral wall 24a of the clutch drum 24 by a centrifugal force arising from the rotation of a crankshaft (not shown) of the engine 10 so as to transmit the rotation of the crankshaft to the clutch drum 24. The brake device 60 includes a friction member adapted to be pressed against the outer peripheral surface of the peripheral wall 24a so as to brake the rotation of the clutch drum 24. More specifically, the friction member is composed of a brake band 26 extending along the outer peripheral surface of the peripheral wall 24a. The brake band 26 is adapted to be selectively moved between a brake position (shown in solid lines in FIG. 2) where it is tightened around the outer peripheral surface of the peripheral wall 24a and a release position where it is relaxed. More specifically, the brake band 26 has one end 26a fixed to a housing 10a of the engine 10 and the other end 26b coupled to a second coupling point 30b of a swingable member 30 as described in detail later, so that the brake band 26 is moved to either one of the tightened or brake position and the relaxed or release position in response to the swing movement of the swingable member 30. In FIG. 2, the brake band 26 is in the brake position where it is tightened to the outer peripheral surface of the peripheral wall 24a.

A carburetor 50 of the engine 10 is located in an upward and lateral position with respect to the clutch drum 24 in FIG. 2 or when viewing in a direction parallel to a rotational axis O of the clutch drum 24.

As shown in FIG. 2, the portable trimmer 2 according to the first embodiment includes a throttle wire 28 extending between the throttle operation lever 18 to the carburetor 50, and the swingable member 30 interposed in the throttle wire 28 and adapted to swing by a pulling force of the throttle wire 28. The throttle wire 28 comprises a first wire portion 29 extending between the throttle operation lever 18 and the swingable member 30, and a second wire portion 32 extending between the swingable member 30 and the throttle valve of the carburetor 50. The first and second wire portions and the swingable member make up a first operation transmission path P1 for transmitting the movement of the throttle operation lever 18 to the carburetor 50. The portable trimmer 2 according to the first embodiment also includes a pulley 34 rotatably or pivotally attached to the swingable member 30. The second wire portion 32 extends between the carburetor 50 and the additional operation lever 22 through the pulley 34 to provide a second operation transmission path $P_2$ independent of the first operation transmission path $P_1$.

As shown in FIG. 2, the swingable member 30 is pivotally attached to the housing 10a in the interior space of the housing 10a above the clutch drum 24. A pivot 39 between the swingable member 30 and the housing 10a is positioned at the intermediate portion of the swingable member 30. Around the pivot 39, the swingable member 30 has one edge portion located on the opposite side of the carburetor 50 and provided with a first coupling point 30a, a lower portion provided with the second coupling point 30b, and an upper portion provided with the rotatable pulley 34. The swingable member 30 is formed generally in a gingko-leaf shape having a sector-shaped upper portion and an elongated bar-shaped lower portion extending downwardly. The first coupling point 30a is located adjacent to one edge corner of the sector-shaped portion on the opposite side of the carburetor 50. The second coupling point 30b is located at the lower end of the bar-shaped portion. A protrusion 36 is provided in the vicinity of the periphery of the pulley 34 of the swingable member 30 to prevent the second wire portion 32 wound around the pulley 34 from slipping off. The swingable member 30 is biased toward the initial (brake) position by a first spring 38 serving as biasing means. The pulley 34 is located on the side of the carburetor 50.

A first swingable arm member 40 serving as an intermediate member is disposed between the swingable member 30 and the carburetor 50. The first swingable arm member 40 couples the second wire portion 32 and a power adjusting wire 42 which extends in a direction different from the second wire portion 32 and connected to the power adjusting lever 22 in an operationally interconnected manner. Specifically, the first swingable arm member 40 couples the second wire portion 32 extending laterally in an upper interior space of the housing 10a above the clutch drum 24 and the power adjusting wire 42 extending vertically in a side interior space of the housing 10a between the carburetor 50 and the clutch drum 24 in an operationally interconnected manner. The first swingable aim member 40 is formed in a generally L-shape 40 having an upper end provided with a third coupling point 40a, a lateral end provided with a fourth coupling point 40b, and an intermediate corner provided with a pivot 40c. The first swingable arm member 40 is swingable between an initial position as shown in solid lines in FIG. 2 and a swing position as shown in one-dot chain lines, and biased toward the initial position by a second spring 44 serving as biasing means.

The first wire portion 29 of the throttle wire 28 has one end coupled to the throttle operation lever 18 and the other end coupled to the first coupling point 30a of the swingable member. The first wire portion 29 extends vertically in a side interior space of the housing on the opposite side of the carburetor 50 with respect to the clutch drum 24.

On the other hand, the second wire portion 32 has one end 32a coupled to the throttle valve (not shown) of the carburetor 50. The second wire portion 32 first extends laterally from the carburetor 50 and then, curves around the pulley 34 to form a U-shape and extends laterally toward the carburetor 50. The other end of the second wire portion 32 is coupled to the third coupling point 40a of the first swingable arm member 40. The power adjusting wire 42 extends vertically in the side interior space of the housing between the carburetor 50 and the clutch drum 24, and has one end coupled to the power adjusting lever 22 and the other end coupled to the fourth coupling point 40b of the first swingable arm member 40. Thus, the second operation transmission path $P_2$ is curvedly turned in a form of a U-shape around the pulley 34 disposed on the lateral side of the carburetor 50, and then turned downwardly via the first swingable arm member 40.

The second wire portion 32 is wound around the pulley 34 with a play. That is, a predetermined play is provided to the second wire portion 32 to take up a pulling force which is otherwise applied to the second wire portion 32 in an initial stroke range of the throttle operation lever 18. This play is arranged such that the throttle valve of the carburetor 50 is opened up to an intermediate opening position to operate the engine 10 at a given intermediate power, in a full stroke position of the throttle operation lever 18 or when the throttle operation lever 18 is manipulated to the limit. If the power adjusting lever 22 is manipulated with maintaining the full stroke position of the throttle operation lever 18, the second wire portion is further pulled to eliminate the play, and whereby the throttle valve is opened in proportion to the stroke of the throttle operation lever 18 over the entire stroke range thereof.

The portable trimmer 2 in FIG. 2 according to the first embodiment is operated as follows:

At the initial (braking) position, the swingable member 30 and the pulley 34 is positioned as shown in the solid lines in FIG. 2. The second wire portion 32 is positioned around the pulley 34 with the play. The first swingable arm member 40 is positioned as shown in the solid lines in FIG. 2.

When only the throttle operation lever 18 is manipulated without manipulating the power adjusting lever 22, the swingable member 30 is swung or rotated counterclockwise in FIG. 2. Thus, the pulley 34 is moved from an initial position shown in the solid lines in FIG. 2 to a maximum movement position as shown in the one-dot chain lines. In the initial stroke range of the throttle operation lever 18, even if the pulley 34 is moved, no pulling force is applied to the second wire portion 32 because of the play of the second wire portion 32. When the pulley 34 is moved by a given distance, the play is eliminated and the second wire portion is tensioned. Thus, by further operating the throttle operation lever 18 and moving the pulley 34, the throttle valve is opened with an opening corresponding to the given intermediate power. Since the second wire portion 32 is curved in the form of the U-shape around the pulley 34, the second wire portion 32 is pulled by a length two times of the moved distance of the pulley 34.

On the other hand, when the power adjusting lever 22 is manipulated, the portable trimmer will be operated as follows: When the power adjusting lever 22 is manipulated, the first swingable aim member 40 is moved from the initial position as shown in the solid lines in FIG. 2 to the swing position as shown in the one-dot chain lines in a pulling direction of the second wire portion 32. Thus, the second wire potion 32 is pulled to eliminate the play or to provide a tension to the second wire potion 32. By manipulating the throttle operation lever 18 in this state or when the second wire portion is under tension without any play, the second wire portion 32 is pulled by the throttle operation lever 18 over the entire stroke thereof (During this stroke, the pulley 34 is moved from the initial position as shown in the solid lines to the maximum movement position as shown in the one-dot chain lines) in response to the manipulation of the throttle operation lever 18. Thus, the throttle valve is fully opened, and the engine is operated at its maximum power.

The portable trimmer 2 according to the first embodiment has the first operation transmission path $P_1$ extending from the throttle operating lever 18 to the throttle valve through the first wire portion 29, the swingable member 30, the pulley 34 and the second wire portion 32, and the second operation transmission path $P_2$ extending from the power adjusting lever 22 to the throttle valve through the second wire portion 32 coupled to the power adjusting lever 22 in an operationally interconnected manner. The second operation transmission path $P_2$ is operationally independent of the first operation transmission path $P_1$, and whereby the power adjusting lever 22 is manipulated during the manipulation of the throttle operation lever 18 anytime according to need.

When the throttle operation lever 18 is released, the swingable member 30 is returned to the initial (braking) position by the first spring 38. Further, when the power adjusting lever 22 is released, the first swingable arm member 40 is returned to the initial position by means of a biasing force of a throttle-valve return spring (not shown) generally provided in the carburetor 50 and the second spring 44 which may be provided if needed.

The portable trimmer 2 according to the second embodiment will be described with reference to FIG. 3. The portable trimmer 2 according to the second embodiment includes an idle-up operation lever 41 for slightly opening the throttle valve to facilitate starting of the internal combustion engine during warm-up. The idle-up operation lever 41 protrudes outside through the housing 10a. While the portable trimmer 2 according to the first embodiment includes the power adjusting lever 22 provided at the left grip 20, the portable trimmer 2 according to the second embodiment has no power adjusting function, and no such lever is provided.

The portable trimmer 2 according to the second embodiment will be described in detail with reference to FIG. 3. The same components or elements as those of the first embodiment in FIG. 2 are defined by the same reference numeral and they will be schematically described. In the following description, different points between the first and second embodiment will be primarily described.

As for the portable trimmer 2 according to the second embodiment, it includes the clutch drum 24, and the brake band 26 extending along the outer peripheral surface of the peripheral wall 24a. The brake band 26 is tightened around the outer peripheral surface of the peripheral wall 24a in a brake position as shown by a solid line in FIG. 3, and relaxed in a brake release position as shown in the one-dot chain lines. The above structure is the same as that of the first embodiment. Further, the portable trimmer 2 according to the second embodiment includes a throttle wire 28 extending between the throttle operation lever 18 to the throttle valve, and the swingable member 30 interposed in the throttle wire 28 and adapted to swing by a pulling force of the throttle wire 28. The throttle wire 28 comprises a first wire portion 29 extending between the throttle operation lever 18 and the swingable member 30, and a second wire portion 32 extending between the swingable member 30 and the throttle valve. The above structure is also the same as that of the first embodiment. In addition, the respective shapes of and physical relationship between the swingable member 30 and the pulley 34 and the coupling relationship between the first and second wire portions 29 and 32 are the same as those of the first embodiment.

The second embodiment includes a second swingable arm member 42 disposed between the swingable member 30 and the throttle valve and adapted to be swingably moved in response to the movement of the idle-up operation lever 41. The second swingable arm member 42 is formed generally in a vertically elongated shape having a lower end provided with a pivot 42a. The idle-up operation lever 41 disposed outside of the housing 10a is integrally coupled to the pivot 42a. Further, the second swingable arm member 42 has an upper end provided with a fifth coupling point 42b to which the other end 32b of the second wire portion 32 is coupled. The second swingable arm member 42 is adapted to swing between an initial position as shown in the solid lines in FIG. 2 and a swing position as shown by the one-dot chain line. The second swingable arm member 42 is returned to the initial position by means of a biasing force of a throttle-valve return spring (not shown) generally provided in the carburetor 50 and a third spring 45 which may be provided as biasing means if necessary.

The one end 32a of the second wire portion 32 is coupled to the throttle valve. The second wire portion 32 first extends laterally from the throttle valve. After the second wire portion 32 turns around the pulley 34 in the form of a U-shape, the other ends 32a is coupled to the fifth coupling point 42b of the second swingable aim member 42. In the position as shown in solid lines in FIG. 3, the brake band 26 is in the brake position where it is tightened to the peripheral wall of the clutch drum 24. In this position, the second wire portion 32 is wound around the pulley 34 without any play.

The portable trimmer 2 in FIG. 3 according to the second embodiment is operated as follows.

Figure 3:
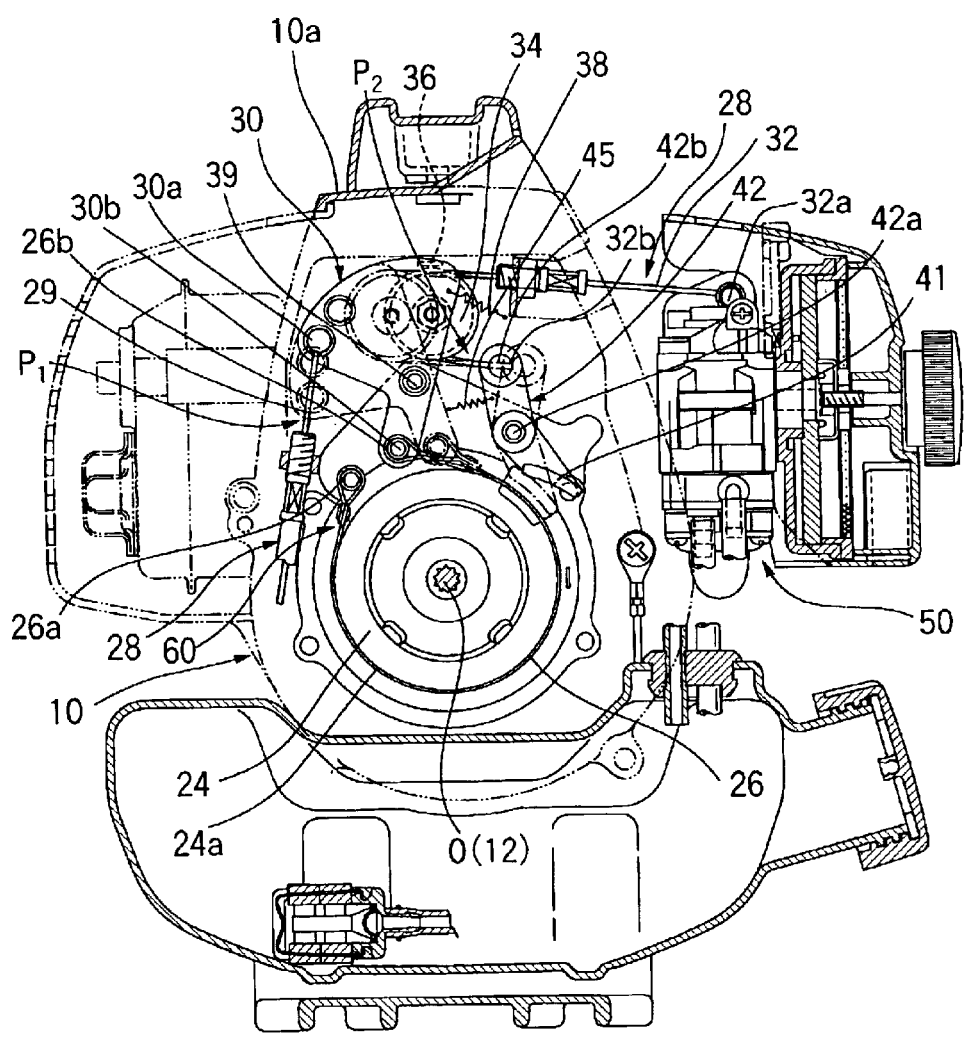
FIG. 3 is a view showing the internal structure of the body of a portable trimmer according to a second embodiment of the present invention.

Before starting the internal combustion engine 10, the idle-up operation lever 41 protruding outside through the housing 10a is first pushed downward to move the second swingable arm member 42 counterclockwise from the position as shown by the solid line in FIG. 3 to the position as shown by the one-dot chain line. The second wire portion 32 is somewhat pulled according to the swing movement of the second swingable arm member 42 to slightly open the throttle valve from an idle position. In this idle-up position, the engine 10 is started by means of a recoil starter 10b (see FIG. 1) or the like. When the throttle operation lever 18 is subsequently manipulated, the swingable member 30 is swung or rotated through the throttle wire 28. Thus, the pulley 34 is moved from the initial position as shown in the solid lines in FIG. 3 to the maximum movement position as shown in the one-dot chain lines. The throttle valve is opened in response to this movement. When the throttle operation lever 18 is moved to the full stroke position, the throttle valve is opened by the full throttle opening and thereby the engine is operated at the maximum power.

The partial idle operation lever 41 can be released by moving it in the opposite direction.

The present invention is not limited to the above embodiment but various modifications can be made without departing from the sprit and scope of the present invention. Such equivalents are intended to be encompassed in the scope of the following claims.

For example, while the brake device 60 of the portable trimmers 2 according to the first and second embodiments include the friction member composed of the brake band 26 disposed around the peripheral surface of the clutch drum 24, any other suitable friction member capable of being pressed against the outer surface of the clutch drum 24 to brake the rotation of the clutch drum and being released according to the swing movement of the swingable member may be used.

The portable trimmers 2 according to the first and second embodiments are advantageous in that the first or second swingable arm member 40, 42 is interposed in the second operation transmission path $P_2$ so as to facilitate changing the direction of the wire member to effectively layout the wire member and others in the limited interior space of the housing 10a. However, if there is no need for changing the direction of the wire member, such a member is not essential.

While the swingable member 30 of the portable trimmers 2 according to the first and second embodiments is formed in a gingko-leaf shape, any other suitable shape or configuration having coupling points for the throttle wire 28 and the brake band 26 may be used. For example, it may be a T-shape having three ends provided with the first coupling point 30a, the second coupling point 30b and the pulley 34, respectively.

Further, in the first embodiment, the power adjusting lever 22 is manipulated to generate a tension in the second wire portion 32, i.e. to eliminate the play, so as to provide the maximum power. Conversely, the second wire portion 32 may be arranged to have no play at the initial position, and the power adjusting lever 22 may be manipulated so as to provide allow a given play in the second wire portion to reduce the maximum power down to the intermediate power.

As described above, the present invention can provide an improved portable trimmer of the type in which a brake device for braking the movement of a cutting blade is released in conjunction with a throttle operation according to a throttle operation lever, capable performing an additional operation in combination with or independently of the throttle operation according to the throttle operation lever.

What is claimed is:

1. A portable trimmer comprising:
an internal combustion engine;
a cutting blade driven by said internal combustion engine;
a centrifugal clutch for transmitting a driving force of said internal combustion engine to said cutting blade, said centrifugal clutch having a clutch drum;
a carburetor having a throttle, a throttle operation lever for opening said throttle, a throttle wire extending between said throttle operation lever and said carburetor, a swingable member interposed in said throttle wire and being swingable in response to a pulling force of said throttle wire exerted by an operation of said throttle operation lever, said throttle wire including a first wire portion extending between said throttle operation lever and said swingable member, and a second wire portion extending between said swingable member and said carburetor to provide a first operation transmission path for transmitting the movement of said throttle operation lever to said carburetor;
a brake device for braking the movement of said cutting blade, said brake device being released in conjunction with said operation of said throttle operation lever, said brake device including a friction member which is movable in response to the swing movement of said swingable member between a brake position where said friction member is pressed against said clutch drum and a release position where said friction member is spaced apart therefrom; and
an additional operation lever for performing a different operation from said throttle operation, said swingable member being provided with a pulley pivotally attached thereto, said second wire portion extends between said carburetor and said additional operation lever via said pulley to provide a second operation transmission path independent from said first operation transmission path.

2. The portable trimmer as recited in claim 1, wherein said second wire portion has a predetermined amount of play for taking up a pulling force which is otherwise applied to said second wire portion in an initial stroke range of said throttle operation lever, said play is set such that said engine is operable at a given intermediate power when said throttle operation lever is at a full stroke position, and
said additional operation lever is a power adjusting lever operable to pull said second wire portion to open said carburetor so as to increase a power of said engine higher than said given intermediate power when said throttle operation lever is said full stroke position.

3. The portable trimmer as recited in claim 1, wherein said additional operation lever is an idle-up lever operable to pull said second wire portion so as to partially open said carburetor to increase an idling speed of said engine at the time of starting said engine.

4. The portable trimmer as recited in claim 1, further including an intermediate member coupled to said second operation transmission path, and a housing for enclosing at least a part of said engine, and wherein said carburetor is located at a lateral and upward position with respect to said clutch drum when viewed in a direction parallel to a rotational axis of said clutch drum,
said swingable member is located above said clutch drum,
said intermediate member is disposed between said swingable member and said carburetor,
said first wire portion extends vertically to said swingable member in a side interior space of said housing on the opposite side of said carburetor with respect to said clutch drum,
said second wire portion has a first end coupled to said carburetor and a second end coupled to said intermediate member, said second wire portion extending laterally from said carburetor in an upper interior space of said housing above said clutch drum, then curves along said pulley and extends to said second end, whereby a pulling force generated by operating said additional operation lever is transmitted to said second wire portion through said intermediate member.

5. The portable trimmer as recited in claim 2, further including an intermediate member coupled to said second operation transmission path, and a housing for enclosing at least a part of said engine, and wherein said carburetor is located at a lateral and upward position with respect to said clutch drum when viewed in a direction parallel to a rotational axis of said clutch drum,
said swingable member is located above said clutch drum,
said intermediate member is disposed between said swingable member and said carburetor,
said first wire portion extends vertically to said swingable member in a side interior space of said housing on the opposite side of said carburetor with respect to said clutch drum,
said second wire portion has a first end coupled to said carburetor and a second end coupled to said intermediate member, said second wire portion extending laterally from said carburetor in an upper interior space of said housing above said clutch drum, then curves along said pulley and extends to said second end, whereby a pulling force generated by operating said additional operation lever is transmitted to said second wire portion through said intermediate member.

6. The portable trimmer as recited in claim 3, further including an intermediate member coupled to said second operation transmission path, and a housing for enclosing at least a part of said engine, and wherein said carburetor is located at a lateral and upward position with respect to said clutch drum when viewed in a direction parallel to a rotational axis of said clutch drum,
said swingable member is located above said clutch drum,
said intermediate member is disposed between said swingable member and said carburetor,
said first wire portion extends vertically to said swingable member in a side interior space of said housing on the opposite side of said carburetor with respect to said clutch drum,
said second wire portion has a first end coupled to said carburetor and a second end coupled to said intermediate member, said second wire portion extending laterally from said carburetor in an upper interior space of said housing above said clutch drum, then curves along said pulley and extends to said second end, whereby a pulling force generated by operating said additional operation lever is transmitted to said second wire portion through said intermediate member.

* * * * *